US012487198B2

United States Patent
Wakabayashi et al.

(10) Patent No.: US 12,487,198 B2
(45) Date of Patent: Dec. 2, 2025

(54) CONCENTRATION DETECTION DEVICE AND CONCENTRATION DETECTION METHOD

(71) Applicant: RIKEN, Wako (JP)

(72) Inventors: Yasuo Wakabayashi, Wako (JP); Yoshie Otake, Wako (JP); Yujiro Ikeda, Wako (JP)

(73) Assignee: RIKEN, Wako (JP)

( * ) Notice: Subject to any disclaimer, the term of this patent is extended or adjusted under 35 U.S.C. 154(b) by 502 days.

(21) Appl. No.: 17/923,057

(22) PCT Filed: May 10, 2021

(86) PCT No.: PCT/JP2021/017704
§ 371 (c)(1),
(2) Date: Nov. 3, 2022

(87) PCT Pub. No.: WO2021/230201
PCT Pub. Date: Nov. 18, 2021

(65) Prior Publication Data
US 2023/0152250 A1    May 18, 2023

(30) Foreign Application Priority Data
May 13, 2020 (JP) ................. 2020-084238

(51) Int. Cl.
*G01N 23/222* (2006.01)
(52) U.S. Cl.
CPC ... *G01N 23/222* (2013.01); *G01N 2223/0745* (2013.01); *G01N 2223/106* (2013.01)
(58) Field of Classification Search
CPC ............ G01N 33/383; G01N 23/222
See application file for complete search history.

(56) References Cited

U.S. PATENT DOCUMENTS 5,081,351 A * 1/1992 Roscoe ............... G01V 5/101
250/266
11,841,335 B2 * 12/2023 Wakabayashi ........... G01T 1/16
(Continued)

FOREIGN PATENT DOCUMENTS

| JP | 61-210932 A |    | 9/1986 |
|----|-------------|----|--------|
| JP | 62-282288 A |    | 12/1987 |
| JP | H08220029 A | *  | 8/1996 |
| JP | 2001-194324 A |  | 7/2001 |

(Continued)

OTHER PUBLICATIONS

Spyrou, N.M., "Elemental analysis of biological matrices using tomographic techniques," Article, Journal of Radioanalytical and Nuclear Chemistry (1993).
(Continued)

*Primary Examiner* — Lily C Garner
(74) *Attorney, Agent, or Firm* — Volpe Koenig

(57) ABSTRACT

A concentration detector includes: a neutron source emitting neutrons to a target; a gamma ray detector detecting and determining an amount of specific gamma rays that are among gamma rays generated in the target by interactions with the neutrons; and a concentration calculator calculating a concentration of the target at selected depths in the inspection target, based on the detected amount. A relational expression expressing a relation between a plurality of concentrations of the target in a plurality of virtual layers and a detected amount of the specific gamma rays is pre-determined for each type of the specific gamma rays or each detection condition. The concentration calculator applies the detected amount for each gamma ray type or each detection condition, to the relational expression for the type or the detection condition, and calculates a concentration of the target component in the layer at each depth or the specific depth.

7 Claims, 8 Drawing Sheets

(56) References Cited

U.S. PATENT DOCUMENTS

| | | | | |
|---|---|---|---|---|
| 2003/0011387 A1* | 1/2003 | Trejo | .................... | G01N 17/02 |
| | | | | 324/700 |
| 2012/0199754 A1* | 8/2012 | Nose | .................. | G01N 23/222 |
| | | | | 250/393 |
| 2021/0033542 A1* | 2/2021 | Wakabayashi | ......... | G01N 23/22 |

FOREIGN PATENT DOCUMENTS

| | | | |
|---|---|---|---|
| JP | 3323042 B2 * | 9/2002 | |
| JP | 5926362 B1 * | 5/2016 | |
| WO | 2011/046078 A1 | 4/2011 | |
| WO | 2019/198260 A1 | 10/2019 | |

OTHER PUBLICATIONS

Spyrou, N.M., "Prompt and delayed radiation measurements in the elemental analysis of biological materials: The case for neutron induced gamma-ray emission tomography," Article, Journal of Radioanalytical and Nuclear Chemistry (1987).
Extended European Search Report issued on Oct. 6, 2023 for European Patent Application No. 21803016.1.
Japanese Office Action issued on Oct. 6, 2023 for Japanese Patent Application No. 2020-084238.
International Preliminary Report on Patentability issued on Nov. 15, 2022 for PCT International Application No. PCT/JP2021/017704.
Japanese Office Action issued on Dec. 15, 2023 for Japanese Patent Application No. 2020-084238.
Communication pursuant to Article 94(3) EPC issued on Sep. 23, 2025 for European Patent Application No. 21803016.1.

* cited by examiner

CONCENTRATION DETECTION DEVICE AND CONCENTRATION DETECTION METHOD

TECHNICAL FIELD

The present invention relates to a technique of determining a concentration of a target component existing in an inspection target.

BACKGROUND ART

Patent Literature 1 mentioned below discloses a device and a method that non-destructively determines a depth at which a target component exists in an inspection target, and determines a concentration of the target component at the determined depth.

According to Patent Literature 1, a depth at which a target component exists and a concentration of the target component are determined as follows: Neutrons are emitted to an inspection target, and specific gamma rays are detected. The specific gamma rays are among gamma rays generated by interactions with the neutrons, and are derived from the target component in the inspection target. At the time of detecting the specific gamma rays, intensities of a plurality of types of the specific gamma rays having different energies are detected as detection intensities.

Next, a ratio between the detected intensities of a plurality of the types of the specific gamma rays is determined as an index value indicating a depth at which the target component exists. This ratio is applied to an associated relation between a ratio and a depth. Thereby, a depth at which the target component exists is determined.

According to Patent Literature 1, the determined depth and the intensity of the specific gamma rays are applied to an associated relation among a depth, a detected intensity of the gamma rays, and a concentration of the target component. Thereby, a concentration of the target component at the determined depth is determined.

Such a technique enables detection of a depth and a concentration of chlorine as a target component in a concrete structure, for example. Based on this detected result, a possibility that reinforcing bars in the concrete structure are corroded due to chloride can be recognized.

CITATION LIST

Patent Literatures

PTL 1: International Publication No. WO2019/198260

SUMMARY OF INVENTION

Technical Problem

A technique is desired in which a concentration of a target component at each depth or a concentration of the target component at an intended specific depth in an inspection target is non-destructively detected.

In view of it, an object of the present invention is to provide a device and a method that can non-destructively determine a concentration of a target component at each depth or an intended specific depth in an inspection target.

Solution to Problem

In order to solve the above-described object, a concentration detection device according to the present invention includes: a neutron source that emits neutrons to a surface of an inspection target; a gamma ray detection device that detects specific gamma rays, and determines a detected amount of the specific gamma rays, wherein the specific gamma rays are among gamma rays generated in the inspection target by interactions with the neutrons, and are derived from a target component; and a concentration calculation device that calculates a concentration of the target component at each depth or a specific depth in the inspection target, based on the detected amount.

When the inspection target is virtually divided into multiple (a plurality of) layers, a relational expression expressing a relation between a plurality of concentrations of the target component in the plurality of layers and a detected amount of the specific gamma rays is predetermined for each of types of the specific gamma rays or each of detection conditions, and is held in the concentration calculation device.

The concentration calculation device applies the detected amount determined by the gamma ray detection device for each of the types or each of the detection conditions, to the relational expression for the type concerned or the detection condition concerned, thereby generates simultaneous equations, solves the simultaneous equations, and thereby calculates a concentration of the target component in the layer at each depth or the specific depth.

In order to solve the above-described object, a concentration detection method includes: (A) emitting neutrons to a surface of an inspection target by a neutron source; and (B) detecting specific gamma rays, and determining a detected amount of the specific gamma rays, wherein the specific gamma rays are among gamma rays generated in the inspection target by interactions with the neutrons, and are derived from a target component.

The detecting at (B) is performed for the specific gamma rays of a plurality of types different from each other or for a plurality of detection conditions different from each other so as to determine a plurality of the detected amounts for the plurality of types or the plurality of detection conditions.

The method includes: (C) calculating a concentration of the target component, based on a plurality of the detected amounts, by a concentration calculation device.

When the inspection target is virtually divided into a plurality of layers, a relational expression expressing a relation between a plurality of concentrations of the target component in the plurality of layers and a detected amount of the specific gamma rays is predetermined for each of the types or each of the detection conditions, and is held in the concentration calculation device.

Processing at (C) includes: applying the detected amount determined at (B) for each of the types or each of the detection conditions, to the relational expression for the type concerned or the detection condition concerned, thereby generating simultaneous equations; and solving the simultaneous equations, thereby calculating a concentration of the target component in the layer at each depth or a specific depth.

Advantageous Effects of Invention

According to the present invention, it is possible to non-destructively determine a concentration of a target component at each depth or an intended specific depth.

DESCRIPTION OF EMBODIMENTS

The following describes embodiments of the present invention, with reference to the drawings. The same reference sign is allocated to the corresponding part in each of the drawings, and duplicate description is omitted. The following description does not limit the invention described in claims. For example, the present invention is not limited to one including all of the constituent elements described below.

FIRST EMBODIMENT

Concentration Detection Device

Figure 1:
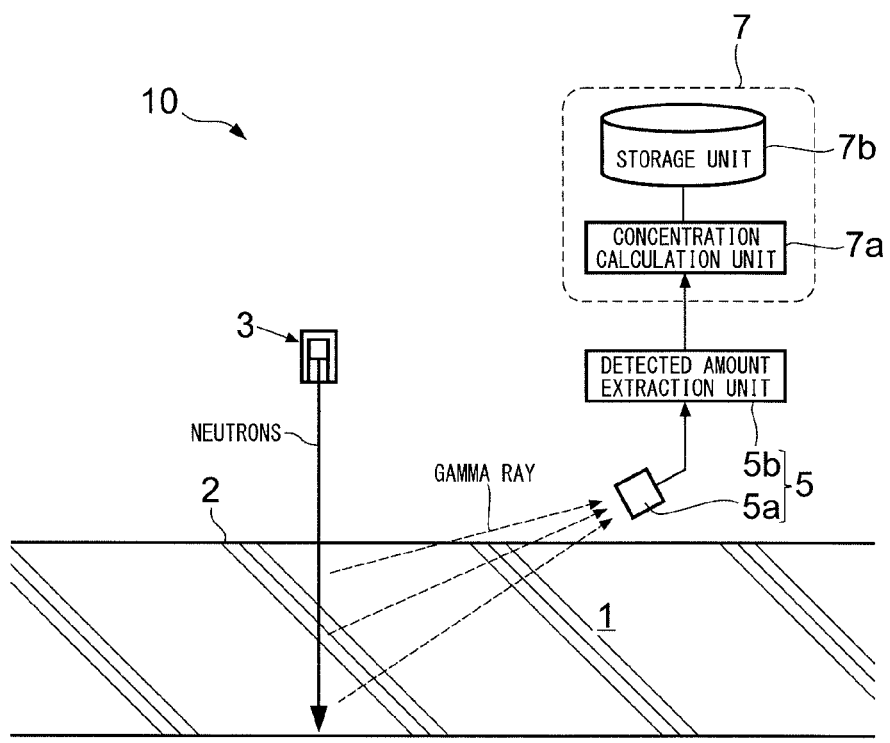
FIG. 1 illustrates a configuration example of a concentration detection device according to a first embodiment of the present invention.

FIG. 1 illustrates a configuration of a concentration detection device 10 according to a first embodiment of the present invention. The concentration detection device 10 emits neutrons to a surface 2 of an inspection target 1 from an outside of the inspection target 1, and detects gamma rays (hereinafter, simply referred to as specific gamma rays) that are among gamma rays generated in the inspection target 1 by interactions with the neutrons and that are derived from a target component in the inspection target 1. Based on this detected result, the concentration detection device 10 determines a concentration of the target component at each depth or a specific depth in the inspection target 1. Here, the depth is a depth from the surface 2 of the inspection target 1. The concentration of the target component may be a concentration of an element as the target component.

In one embodied example, the inspection target 1 is a concrete structure that includes reinforcing bars inside, and the target component is chlorine (or chloride ions). When the target component is chlorine, chlorine may be, for example, the stably existing isotope $^{35}Cl$ of chlorine Cl. The inspection target 1 and the target component are not limited to a combination of a concrete structure and chlorine. In other words, the inspection target 1 is not limited to a concrete structure, and the target component may be any component emitting specific gamma rays by reaction with neutrons that have entered (into) the inspection target 1. For example, the target component may be calcium (particularly, $^{40}Ca$), silicon (particularly, $^{28}Si$), or the like. Hydrogen ($^1H$) emits only one type of specific gamma rays (having a single energy), and thus, is inappropriate as the target component in the first embodiment and a second embodiment that use a plurality of types of specific gamma rays as described below. However, in a third embodiment described below, the target component may be hydrogen.

The concentration detection device 10 includes a neutron source 3, a gamma ray detection device 5, and a concentration calculation device 7.

The neutron source 3 emits a large number of neutrons (as a neutron beam, for example) to the surface 2 of the inspection target 1, and thereby make the neutrons enter the inspection target 1. In one example, the neutron source 3 may be a radioactive isotope source (RI source) that generates neutrons. In this case, the radioactive isotope source may be californium $^{252}Cf$, but is not limited to this. In another example, the neutron source 3 may include a target that generates neutrons by a charged particle beam emitted thereto. In this case, such a target may be beryllium, but is not limited to this.

Neutrons that have entered the inspection target 1 by the neutron source 3 react with the target component in the inspection target 1. As a result, the specific gamma rays deriving from the target component are generated. In the first embodiment, a plurality of types of the specific gamma rays having respective different energies are generated from the target component. When the target component is chlorine, a plurality of types of the specific gamma rays include the specific gamma rays having respective energies of 517 keV, 786 keV, 788 keV, 1165 keV, 1951 keV, and 6111 keV.

The gamma ray detection device 5 detects the specific gamma rays that are among gamma rays generated in the inspection targe 1 by interactions with the neutrons and that are derived from the target component, and determines a detected amount of the specific gamma rays. The gamma ray detection device 5 includes a gamma ray detector 5a and a detected amount extraction unit 5b.

The gamma ray detector 5a detects gamma rays for each energy of the gamma rays from the inspection target 1, and inputs the thus-acquired detected data to the detected amount extraction unit 5b. The detected data may indicate a pulse height corresponding to an energy of each of the detected gamma rays. The gamma ray detector 5a may be constituted by a germanium detector, for example, but is not limited to this. In the first embodiment, the gamma ray detector 5a may be provided with the below-described collimator 6.

The detected amount extraction unit 5b determines a detected amount of the specific gamma rays, based on the input detected data. For example, the detected amount extraction unit 5b generates an energy spectrum of the gamma rays, based on the respective pulse heights indicated by the detected data input from the gamma ray detector 5a. This energy spectrum indicates the number of times the gamma ray is detected, for each of the energies of the gamma rays. Based on the energy spectrum, the detected amount extraction unit 5b determines, as the detected amount, the number of times the specific gamma ray is detected, (for each of n types (n is an integer equal to or larger than two) of the specific gamma rays among a plurality of types of the generated specific gamma rays, in the first embodiment).

This number of times of the detection may be the number of times of the detection over a predetermined measurement time in the first embodiment. The predetermined measurement time may be a time within a time period during which the neutrons are emitted to the inspection target 1. For example, the predetermined measurement time may be 100 seconds, 200 seconds, or 300 seconds, but is not limited to these times.

The concentration calculation device 7 determines a concentration of the target component at each depth or a specific depth in the inspection target 1, based on detected amounts of the specific gamma rays determined by the gamma ray detection device 5.

In order to determine a concentration of the target component, the inspection target 1 is virtually divided into a plurality of layers (simply referred to also as layers in the present description), in a direction perpendicular to the surface 2. A thickness of each of these layers may be approximately several centimeters (e.g., approximately two centimeters or three centimeters), but may be a value within another range.

Figure 2:
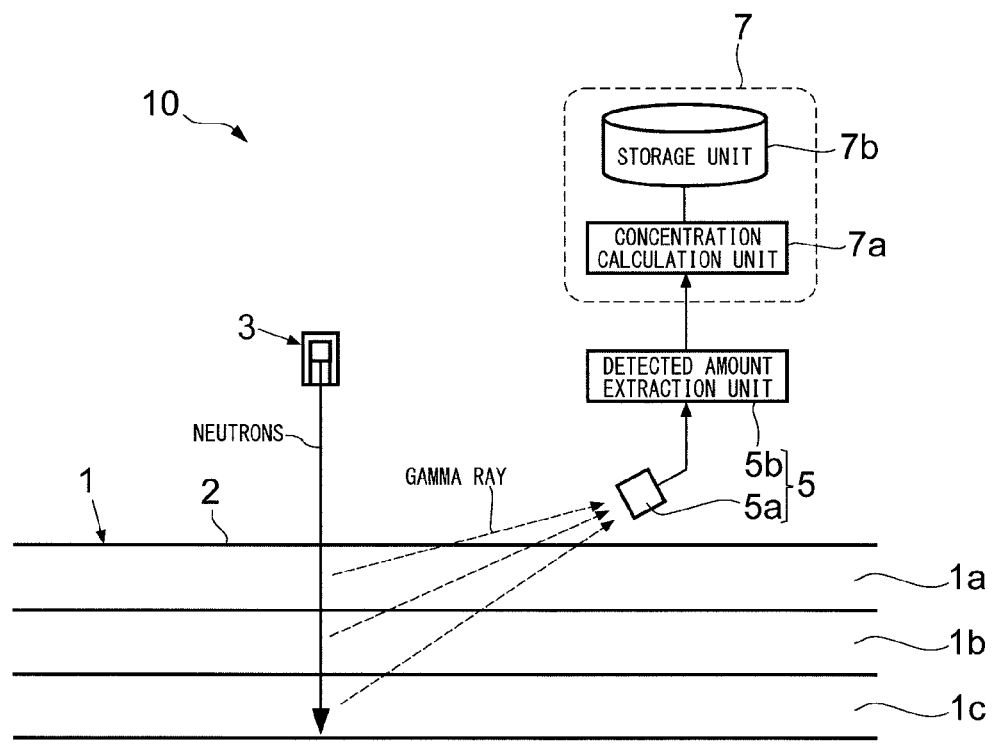
FIG. 2 illustrates one example of the case where an inspection target is virtually divided into a plurality of layers.

FIG. 2 illustrates one example of the case where the inspection target 1 is virtually divided into a plurality of layers 1a, 1b, and 1c. In the example of FIG. 2, the inspection target 1 is divided into the three layers 1a, 1b, and 1c. A plurality of the divided layers may overlap with each other in the direction perpendicular to the surface 2. It is assumed that a concentration of the target component is constant in each of the divided layers. A relational expression (function) that represents a relation between a plurality of concentrations in the respective divided layers and a detected amount of the specific gamma rays to be determined by the gamma ray detection device 5 is predetermined for each type (hereinafter, simply referred to also as a type) of the specific gamma rays, and is held in the concentration calculation device 7.

The above-described relational expression may be represented by the following expression (1).

$$\Sigma X_i \alpha_{i,k} = D_k \quad (1)$$

The meaning of each sign in the relational expression (1) is as follows.

The sign i denotes a number for the above-described layer, and takes a value from 1 to n, where n is the number of the above-described layers.

The sign k denotes the type of the specific gamma rays. In other words, k denotes a number for the type of specific gamma rays for which the detected amount is determined. The sign k takes a value from 1 to n, where n is the number of the above-described layers. In other words, the number of these different types is the same as the number of the layers into which the inspection target 1 is divided. The relational expression (1) is predetermined for each type k. In other words, the n relational expressions (1) are predetermined. For example, when the target component is chlorine ($^{35}$Cl), "k=1, 2, 3" denotes the specific gamma rays having the respective energies of 1165 keV, 1951 keV, and 6111 keV. When the target component is silicon ($^{28}$Si), "k=1, 2, 3" denotes the specific gamma rays having the respective energies of 2092 keV, 3538 keV, and 4933 keV.

The sign $X_i$ denotes a concentration (mass concentration) of the target component in the i-th layer. The sign $X_i$ is an unknown value.

The sign $\alpha_{i,k}$ is a coefficient for the k-th type and i-th layer. The sign $\alpha_{i,k}$ is predetermined.

The sign $D_k$ is a detected amount of the k-th type of the specific gamma rays. This detected amount is determined by the gamma ray detection device 5.

The sign Σ denotes the total sum concerning every i (i.e., all the layers).

In the first embodiment, a detection condition may be the same among a plurality of the (n) types when the concentration detection device 10 determines detected amounts of a plurality of these respective types of the specific gamma rays in inspection (the below-described concentration detection processing) of the inspection target 1. Here, the detection condition include below-described preconditions (b) and (c), and a position relation and an orientation relation among the inspection target 1, the neutron source 3, and the gamma ray detector 5a.

In the first embodiment, the above-described relational expression (e.g., the above-described relational expression (1)) for each type k is an expression for the specific gamma rays of the type corresponding to the type k. In other words, $D_k$ in the relational expression (1) for each type k is a detected amount of the specific gamma rays of the k-th type. Thus, in the first embodiment, $D_k$ is a detected amount of the specific gamma rays of the type denoted by the subscript k.

The concentration calculation device 7 applies a detected amount determined by the gamma ray detection device 5 and concerning each type k of the specific gamma rays, to the above-described relational expression for this type, and thereby generates simultaneous equations. The concentration calculation device 7 solves the generated simultaneous equations, and thereby calculates a concentration of the target component in the layer at each depth or a specific depth. For example, the concentration calculation device 7 applies n detected amounts $D_k$ (k is an integer from 1 to n) determined by the gamma ray detection device 5, to the corresponding respective n relational expressions (1), and thereby generates n relational expressions (simultaneous equations) in which the value of $D_k$ is specified. The concentration calculation device 7 solves the generated simultaneous equations, and thereby calculates a concentration of the target component in the layer at each depth or a specific depth.

Detailed Description of Concentration Detection

The following describes concentration detection in more detail. In the first embodiment, the following matters (a) to (d) are preconditions. These matters (a) to (d) are preconditions also in the second embodiment and the third embodiment described below.

(a) When the inspection target 1 is virtually divided into a plurality of layers, a concentration of the target component is constant in each of these layers as described above. Concerning this, it is assumed that a concentration of the target component in each layer is constant within a certain range in a direction perpendicular to a thickness direction of this layer. This range is assumed to be a concentration-detection-target range in which the specific gamma rays are made generated.

(b) A spectrum of the neutrons emitted from the neutron source 3 to the inspection target 1 is known, and a detected amount of each type of the specific gamma rays is determined for the neutrons of the fixed spectrum. The spectrum of the neutrons is an energy distribution of a large number of neutrons emitted from the neutron source 3 per unit time. In this distribution, for each energy, the number of neutrons having this energy is indicated.

(c) An intensity of the neutrons emitted from the neutron source 3 to the inspection target 1 is known, and a detected amount of each type of the specific gamma rays is determined for the neutrons of the fixed intensity. The intensity of the neutrons is the number of the neutrons emitted from the neutron source 3 to the inspection target 1 per unit time.

(d) The above-described detected amount determined by the gamma ray detection device 5 is expressed by a function (the above-described relational expression) of a plurality of concentrations of the target component in a plurality of the layers. When this function is linear, the relational expression may be the above-described relational expression (1).

When the inspection target 1 is divided into the three layers 1a, 1b, and 1c as illustrated in FIG. 2, the above-described relational expression (1) is expressed as the following three relational expressions (2) to (4).

$$X_1 \times \alpha_{1,1} + X_2 \times \alpha_{2,1} + X_3 \times \alpha_{3,1} = D_1 \quad (2)$$

$$X_1 \times \alpha_{1,2} + X_2 \times \alpha_{2,2} + X_3 \times \alpha_{3,2} = D_2 \quad (3)$$

$$X_1 \times \alpha_{1,3} + X_2 \times \alpha_{2,3} + X_3 \times \alpha_{3,3} = D_3 \quad (4)$$

The relational expression (2) is a relational expression for the first type (k=1) of the specific gamma rays, the relational expression (3) is a relational expression for the second type (k=2) of the specific gamma rays, and the relation expression (4) is a relational expression for the third type (k=3) of the specific gamma rays. In other words, $D_1$, $D_2$, and $D_3$ in the relational expressions (2) to (4) are the respective detected amounts of the specific gamma rays whose types (energies) are different from each other, and are determined at the time of inspecting the inspection target 1 (e.g., at the below-described step S13). In the three relational expressions (2) to (4), the nine coefficients $\alpha_{1,1}$ to $\alpha_{3,3}$ are predetermined as described below. Accordingly, three unknown values $X_1$, $X_2$, and $X_3$ can be determined by solving the relational expressions (2) to (4) as simultaneous equations in which $D_1$, $D_2$, and $D_3$ have been determined. The similar manner applies to the case where the inspection target 1 is divided into a plurality of layers other than three layers.

Concentration Detection Method

The following describes a concentration detection method according to the first embodiment. The concentration detection method is performed using the above-described concentration detection device 10. The concentration detection method includes relational expression acquisition processing and concentration detection processing.

Relational Expression Acquisition Processing

Figure 3:
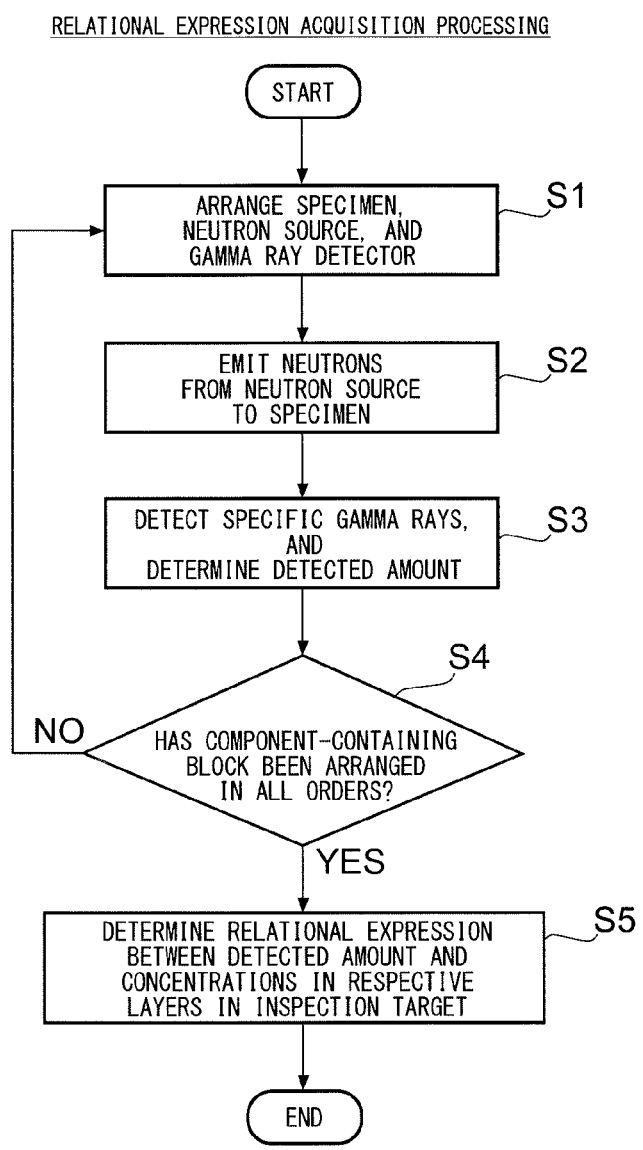
FIG. 3 is a flowchart illustrating relational expression acquisition processing in a concentration detection method according to the first embodiment of the present invention.

FIG. 3 is a flowchart illustrating the relational expression acquisition processing. In the relational expression acquisition processing, when the inspection target 1 is virtually divided into a plurality of layers, a relational expression (e.g., the above-described relational expression (1)) is determined. The determined relational expression expresses a relation between a detected amount and a plurality of concentrations of the target component 1 in a plurality of these respective layers. The relational expression acquisition processing includes steps S1 to S5.

At the step S1, a specimen simulating the inspection target 1, the neutron source 3, and the gamma ray detector 5a are arranged. A position relation and an orientation relation among the specimen, the neutron source 3, and the gamma ray detector 5a arranged at the step S1 are the same as the position relation and the orientation relation among the inspection target 1, the neutron source 3, and the gamma ray detector 5a at the time of actual inspection (i.e., at the time of performing the below-described concentration detection processing).

The specimen is constituted by a plurality of blocks that correspond to a plurality of the above-described respective (n) layers and that are arranged in an order and stacked on each other. The number of the layers is the same as the number of the blocks. Materials and configurations of these blocks are the same as those of the inspection target 1 (parts corresponding to the layers). These blocks have respective thicknesses that are the same as those of a plurality of the layers. Only one block (hereinafter, referred to as a component-containing block) among the blocks constituting the specimen contains the target component at a known concentration, and the other blocks (hereinafter, referred to as component-zero blocks) contain none of the target component. A plurality of the blocks constituting the specimen may have the same size and shape.

Figure 4A:
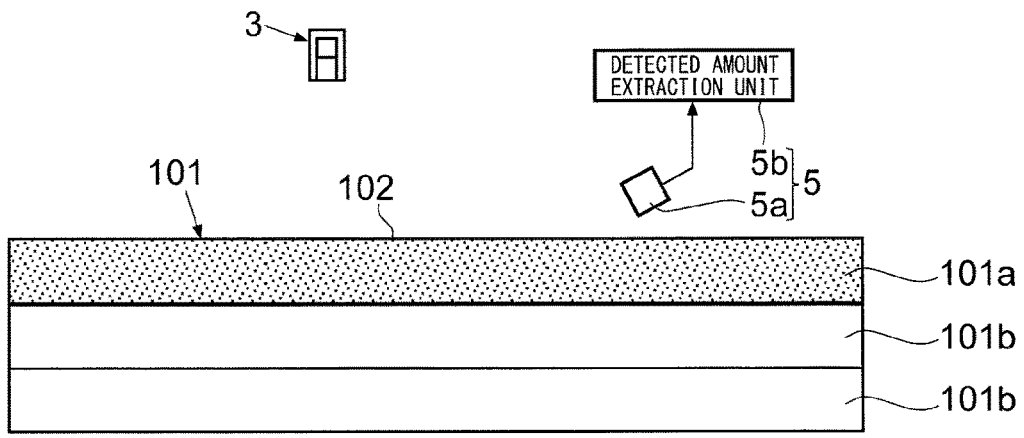
FIG. 4A is an illustration of the relational expression acquisition processing.

In the case of assuming that the inspection target 1 consists of three layers 1a, 1b, and 1c as illustrated in FIG. 2 (in the case of n=3), a specimen 101 constituted by three blocks 101a and 101b, the neutron source 3, and the gamma ray detector 5a are arranged at the step S1, as illustrated in FIG. 4A, for example. In FIG. 4A, the three blocks 101a and 101b includes the block 101a as a component-containing block and the other two blocks 101b as component-zero blocks.

At the step S1, a plurality of the blocks are arranged in an order from a side of the neutron source 3 and stacked on each other so as to constitute the specimen. In this arrangement, the order of the component-containing block counted from the side of the neutron source 3 is assumed to be the i-th order. In an example of FIG. 4A, the order of the component-containing block 101a is the first. When the number of the blocks constituting the specimen is n as described above, there are n possible orders of the first to n-th as the order of the component-containing block.

At the step S2, neutrons are emitted to the specimen by the neutron source 3, in a state of the position relation and the orientation relation among the specimen, the neutron source 3, and the gamma ray detector 5a arranged at the step S1. For example, in FIG. 4A, neutrons are emitted to the specimen 101 by the neutron source 3.

At the step S3, the gamma ray detector 5a detects a plurality of the types of the specific gamma rays that are generated in the specimen (i.e., the component-containing block) by interactions with the neutrons emitted at the step S2 and that are derived from the target component. At the step S3, the thus-acquired detected data are input from the gamma ray detector 5a to the detected amount extraction unit 5b, and based on the detected data, the detected amount extraction unit 5b determines a detected amount $d_{i,k}$ of the specific gamma rays of each of the n types.

The subscript i of $d_{i,k}$ denoting the detected amount indicates the order of the component-containing block arranged at the step S1. In other words, the subscript i indicates that $d_{i,k}$ is the detected amount when the component-containing block is arranged at an i-th position among a plurality of the blocks constituting the specimen 101. The subscript k of $d_{i,k}$ indicates that $d_{i,k}$ is the detected amount of the specific gamma rays of the k-th type among the n types. When the steps S2 and S3 are performed in a state of FIG. 4A, three detected amounts $d_{1,1}$, $d_{1,2}$, and $d_{1,3}$ are determined at the step S3.

After the step S3 is ended, determination at the step S4 is performed so that the above-described steps S1 to S3 are repeated while the order of the component-containing block at the step S1 is changed. At the step S4, it is determined whether or not the steps S2 and S3 have been performed for all of the possible n orders in which the component-containing block is arranged.

When a result of the determination at the step S4 is negative, the processing returns to the step S1, and the above-described steps S1 to S4 are performed again. At the re-started step S1 to which the processing has returned, the specimen, the neutron source 3, and the gamma ray detector 5a are arranged with the specimen being constituted such that the component-containing block is arranged in the order in which the component-containing block has not been arranged yet. The other matters concerning the step S1 may be the same as those described above. For example, the position relation and the orientation relation among the specimen, the neutron source 3, and the gamma ray detector 5a arranged at the re-started step S1 are the same as the position relation and the orientation relation among the inspection target 1, the neutron source 3, and the gamma ray detector 5a at the time of actual inspection. At the re-started step S1, positions and orientations of the neutron source 3 and the gamma ray detector 5a may be kept in a state of the arrangement at the first-time step S1.

Figure 4B:
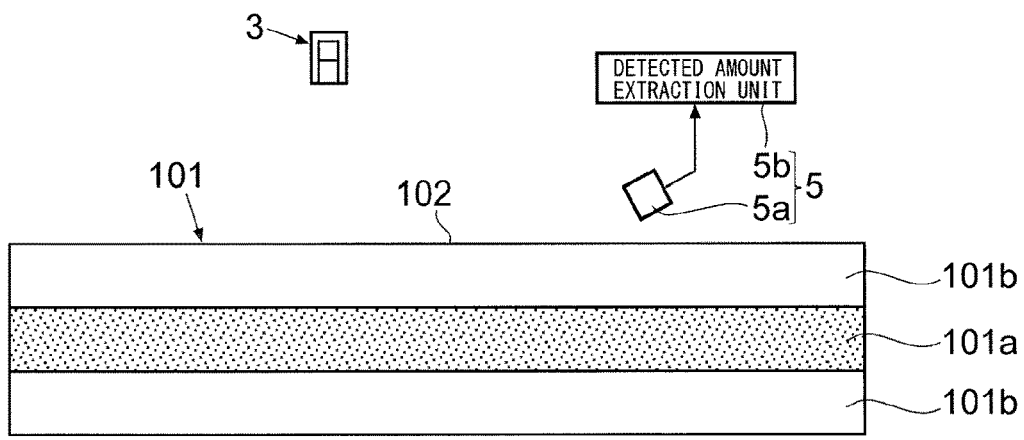
FIG. 4B is another illustration of the relational expression acquisition processing.
Figure 4C:
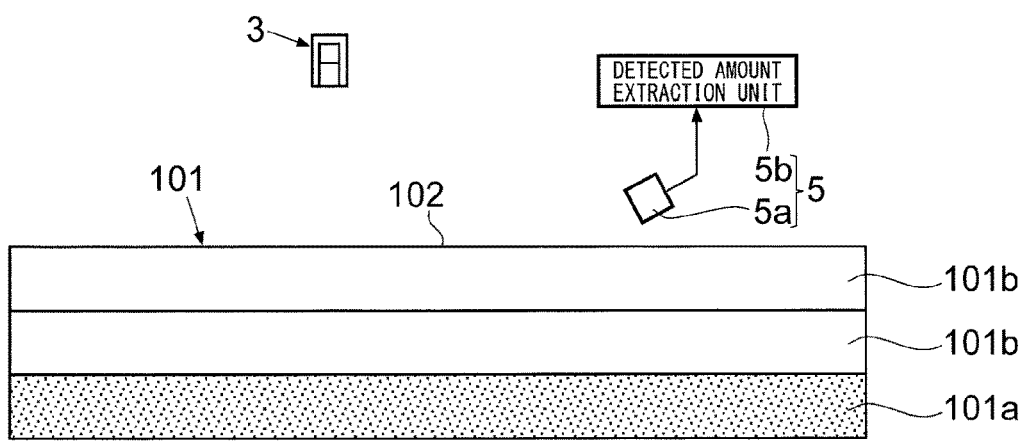
FIG. 4C is another illustration of the relational expression acquisition processing.

When the order of the component-containing block 101a is set as the first at the first-time step S1 as illustrated in FIG. 4A, the order of the component-containing block 101a is set as the second at the second-time step S1 as illustrated in FIG. 4B for example, and the order of the component-containing block 101a is set as the third at the third-time step S1 as illustrated in FIG. 4C. In this case, three detected amounts $d_{2,1}$, $d_{2,2}$, and $d_{2,3}$ are determined at the second-time step S3, and three detected amounts $d_{3,1}$, $d_{3,2}$, and $d_{3,3}$ are determined at the third-time step S3.

The steps S1 to S4 are repeated so that the processing proceeds to the step S5 when a result of the determination at the step S4 is affirmative.

At the step S5, the above-described relational expression is determined based on the detected amount $d_{i,k}$ of the specific gamma rays of each of the n types determined at each of the plural times of the step S3, and the known concentration C of the target component in the component-containing block. The relational expression expresses a relation between a detected amount and respective concentrations of the target component in a plurality of the layers of the inspection target 1. For example, at the step S5, each coefficient $\alpha_{i,k}$ in the above-described relational expression (1) is determined based on the detected amount $d_{1,k}$ of the specific gamma rays of each of the n types determined at each of the plural times of the steps S3, and the concentration C of the target component in the component-containing block. Assuming that a concentration of the target component in each layer is proportional to a detected amount of the specific gamma rays of each type, each coefficient $\alpha_{i,k}$ can be determined by the following expression (5).

$$\alpha_{i,k} = d_{i,k}/C \quad (5)$$

Accordingly, the following relational expression (6) is determined as the relational expression (1) that expresses a relation between a detected amount and respective concentrations of the target component in the n layers of the inspection target 1. The relational expression (6) is stored in a storage unit 7b, and is used in the below-described concentration detection processing.

$$\Sigma X_i \times d_{i,k}/C = D_k \quad (6)$$

In the case where the specimen 101 is constituted by the three blocks 101a and 101b (in the case of n=3) as illustrated in FIG. 4A to FIG. 4C, the following three relational expressions (7) to (9) are acquired as the relational expression (6).

$$X_1 \times d_{1,1}/C + X_2 \times d_{2,1}/C + X_3 \times d_{3,1}/C = D_1 \quad (7)$$

$$X_1 \times d_{i,2}/C + X_2 \times d_{2,2}/C + X_3 \times d_{3,2}/C = D_2 \quad (8)$$

$$X_1 \times d_{i,3}/C + X_2 \times d_{2,3}/C + X_3 \times d_{3,3}/C = D_3 \quad (9)$$

Concentration Detection Processing

Figure 5:
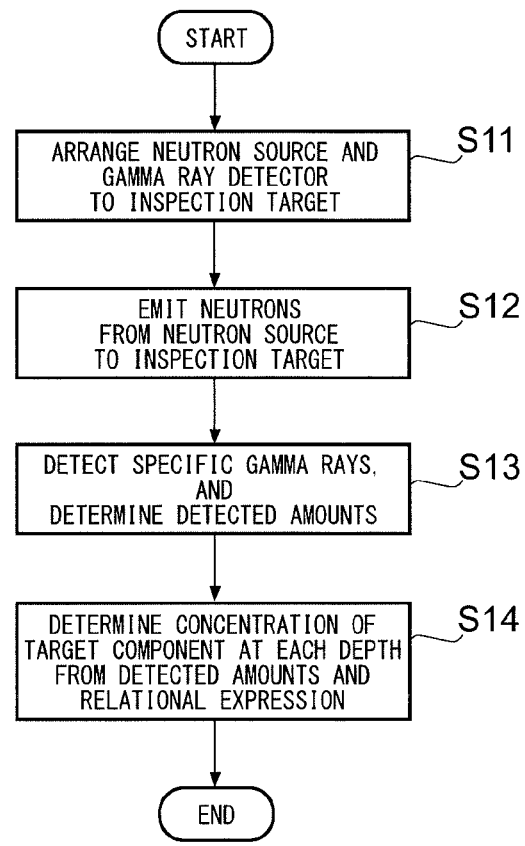
FIG. 5 is a flowchart illustrating concentration detection processing in the concentration detection method according to the first embodiment of the present invention.

FIG. 5 is a flowchart illustrating the concentration detection processing. In the concentration detection processing, the inspection target 1 is actually inspected to thereby detect a concentration of the target component at each depth or a specific depth in the inspection target 1 corresponding to each layer or the specific layer of the inspection target 1. The concentration detection processing includes the steps S11 to S14.

At the step S11, the neutron source 3 and the gamma ray detector 5a are arranged in relation to the inspection target 1. In the arrangement at the step S11, a position relation and an orientation relation among the inspection target 1, the neutron source 3, and the gamma ray detector 5a are set so as to be the same as the position relation and the orientation relation among the specimen, the neutron source 3, and the gamma ray detector 5a arranged at the step S1. More specifically, positions and orientations of the neutron source 3 and the gamma ray detector 5a when viewed from the surface 2 of the inspection target 1 in the arrangement at the step S11 are set so as to be the same as positions and orientations of the neutron source 3 and the gamma ray detector 5a when viewed from a surface (e.g., a surface 102 in FIG. 4A to FIG. 4C) of the specimen in the arrangement at the step S1.

At the step S12, the neutrons are emitted to the surface 2 of the inspection target 1 by the neutron source 3, in a state of the position relation and the orientation relation among the inspection target 1, the neutron source 3, and the gamma ray detector 5a arranged at the step S11.

At the step S13, the gamma ray detector 5a detects a plurality of the types of the specific gamma rays that are generated in the inspection target 1 by interactions with the neutrons emitted at the step S12 and that are derived from the target component. At the step S13, the thus-acquired detected data are input from the gamma ray detector 5a to the detected amount extraction unit 5b, and based on the detected data, the detected amount extraction unit 5b determines a detected amount $D_k$ (k is an integer from 1 to n) of the specific gamma rays of each of the n types.

The number of the detected amounts $D_k$ determined here is the same as the number n of a plurality of the layers divided in the inspection target 1. The subscript k of the detected amount $D_k$ denotes the detected amount determined by the gamma ray detection device 5 and concerning the k-th type of the specific gamma rays.

When the number n of a plurality of the layers is three as illustrated in FIG. 2, the detected amount $D_1$ of the specific gamma rays of the first type, the detected amount $D_2$ of the specific gamma rays of the second type, and the detected amount $D_3$ of the specific gamma rays of the third type are determined at the step S13.

At the step S14, the concentration calculation unit 7a applies the detected amounts $D_k$ of the n types determined at the step S13, to the above-described respective corresponding n relational expressions (1), i.e., $D_k$ (k is an integer from 1 to n) in $\Sigma X_i \times \alpha_{i,k} = D_k$ stored in the storage unit 7b. The concentration calculation unit 7a thereby generates simultaneous equations $\Sigma X_i \times \alpha_{i,k} = D_k$ in which $D_k$ is the specific numerical value, and solves the simultaneous equations. The concentration calculation unit 7a thus calculates, as a concentration of the target component at each depth or the specific depth in the inspection target 1, a concentration of the target component in the layer existing at each depth or the specific depth among a plurality of the layers in the inspection target 1.

When the number n of a plurality of the layers is three as illustrated in FIG. 2, the concentration calculation unit 7a applies the detected amount $D_1$, the detected amount $D_2$, and the detected amount $D_3$ to $D_1$, $D_2$, and $D_3$, respectively, in the above-described relational expressions (7) to (9), at the step S14. Thereby, the concentration calculation unit 7a generates, as simultaneous equations, the relational expressions (7) to (9) in which $D_1$, $D_2$, and $D_3$ are the specific numerical values. The concentration calculation unit 7a solves the simultaneous equations, and thereby determines concentrations $X_1$, $X_2$, and $X_3$ of the target component in the respective layers in the inspection target 1, or a concentration $X_1$, $X_2$, or $X_3$ in the layer at the specific depth in the inspection target 1.

Advantageous Effect of First Embodiment

According to the first embodiment, the inspection target 1 is virtually divided into a plurality of layers, and a relational expression between respective concentrations of the target component in a plurality of these layers and a detected amount of the specific gamma rays is predetermined for each type of the specific gamma rays. At the time of inspection, neutrons are emitted to the inspection target 1, and the specific gamma rays deriving from the target component are thereby generated in the inspection target and are detected. Thus, a detected amount thereof is determined. The detected amount is determined for each type of the specific gamma rays. A plurality of the determined detected amounts are applied to a plurality of the predetermined relational expressions, and thereby, simultaneous equations are generated. By solving the simultaneous equations, a concentration of the target component in the layer existing at each depth or a specific depth among a plurality of the layers in the inspection target 1 can be calculated as a concentration of the target component at each depth or the intended specific depth in the inspection target 1. Thus, a concentration of the target component at each depth or the intended specific depth in the inspection target 1 can be determined non-destructively.

SECOND EMBODIMENT

Concentration Detection Device

Figure 6A:
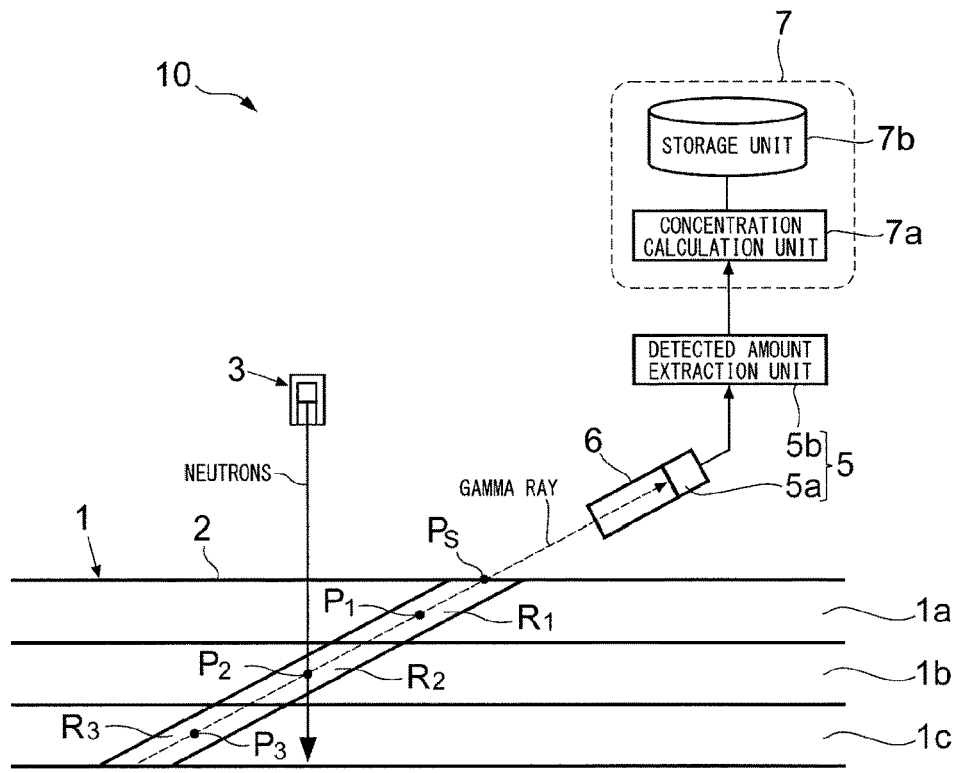
FIG. 6A and FIG. 6B illustrate configuration examples of a concentration detection device according to a second embodiment of the present invention, and also are illustrations for relational expressions.
Figure 6B:
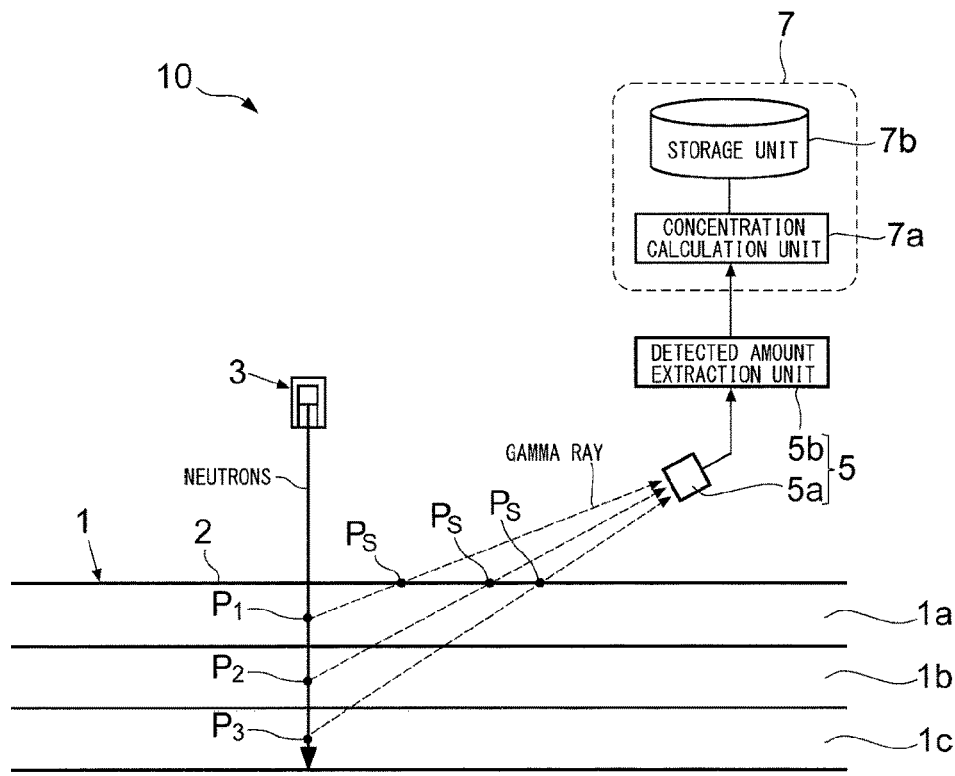

The following describes a concentration detection device 10 according to a second embodiment of the present invention. FIG. 6A and FIG. 6B each illustrate a configuration example of the concentration detection device 10 according to the second embodiment. FIG. 6A illustrates the case where the below-described collimator 6 is provided, and FIG. 6B illustrates the case where the collimator 6 is not provided. In FIG. 6A and FIG. 6B, the inspection target 1 is virtually divided into three layers 1a, 1b, and 1c as one example. Concerning the second embodiment, the matters that are not described below may be the same as those in the first embodiment. The concentration detection device 10 according to the second embodiment includes the neutron source 3, the gamma ray detection device 5, and the concentration calculation device 7, as in the first embodiment.

In the second embodiment, when the inspection target 1 is virtually divided into a plurality of layers as in the first embodiment, measurement or calculation for determining $\alpha_{i,k}$ in each of a plurality of these layers is performed in advance.

In the second embodiment, the relational expression for each of the types may be, for example, the above-described relational expression (1), i.e., $\Sigma X_i \times \alpha_{i,k} = D_k$, as in the first embodiment. Also in the second embodiment, the above-described relational expression (the above-described relational expression (1)) is an expression concerning the specific gamma rays of each type k.

In the second embodiment, a method of determining each coefficient $\alpha_{i,k}$ in the above-described relational expression (1) is different from that in the first embodiment.

The coefficient $\alpha_{i,k}$ is expressed by the following expression (10).

$$\alpha_{i,k} = N_i \times T_{i,k} \times \varepsilon_{i,k} \times b_k \times d_i \times \sigma_i \times (N_A \times r/A) \quad (10)$$

The coefficient $\alpha_{i,k}$ is predetermined under the above-described preconditions (a) to (d). The following describes each sign in the above-described expression (10) that expresses $\alpha_{i,k}$. Supplementary description is appropriately made below with reference to FIG. 6A and FIG. 6B. When the gamma ray detector 5a is provided with the collimator 6 as in the example of FIG. 6A, the gamma ray detector 5a may selectively detect only the specific gamma rays that are among the specific gamma rays generated in the inspection target 1 and that have traveled to the gamma ray detector 5a from a direction corresponding to an orientation of the collimator 6. The meaning of each sign in the expression (10) is as follows.

The sign $N_i$ denotes an amount of neutrons that enter the i-th layer over the above-described predetermined measurement time. Specifically, the position relation and the orientation relation among the inspection target 1, the neutron source 3, and the gamma ray detector 5a at the time of inspection are predetermined, and the entering neutron amount $N_i$ is the number of neutrons that enter the i-th layer in the inspection target 1 as a result of the emission of neutrons to the surface 2 by the neutron source 3 under these position relation and orientation relation. The entering neutron amount $N_i$ may be the number of neutrons that are from the neutron source 3 and that enter the i-th layer without being scattered, or may include not only this number but also the number of neutrons that are scattered in the inspection target 1 and then enter the i-th layer.

When the collimator 6 is provided, the neutron amount $N_i$ may be the number of neutrons entering an overlapping region $R_i$ that is in the i-th layer and that overlaps with the gamma ray detector 5a in a direction of an orientation of the collimator 6. In the example of FIG. 6A, the overlapping region $R_i$ is $R_1$ in the first layer, is $R_2$ in the second layer, and is $R_3$ in the third layer.

By radiation transport simulation or prior experiment, $N_i$ may be predetermined. In the radiation transport simulation, $N_i$ may be determined as follows for example: Behavior of entering neutrons that are from the neutron source 3 and are in the inspection target 1 formed of a known material is determined by radiation transport simulation, and $N_i$ is determined based on this behavior. In the prior experiment, $N_i$ may be determined by the neutron activation analysis as follows, for example: A specimen is prepared. The specimen is formed of the same material as that of the inspection target 1, and has a thickness from the surface 2 to the i-th layer in the inspection target 1. A gold leaf is attached to a back surface of this specimen. Neutrons are emitted from the neutron source 3 (e.g., a $^{252}$Cf radioactive isotope source) to a front surface of such a specimen. Then, gamma rays from the gold foil are measured so that $N_i$ is determined based on a spectrum of the gamma rays.

The sign $T_{i,k}$ denotes a ratio at which the specific gamma rays of the k-th type generated in the i-th layer are transmitted by an inside of the inspection target 1 on a traveling route from the i-th layer to the gamma ray detector 5a. The transmittance $T_{i,k}$ may be determined based on a distance from a reference position $P_i$ in the i-th layer on the route to a position $P_s$ (hereinafter, referred to as a surface position) in the surface 2 on the route. For example, $T_{i,k}$ may be determined by experiment in which a specimen having the same thickness as this distance and made of the same material as that of the inspection target 1 is prepared, and gamma rays are emitted to the specimen from a gamma ray standard source such as $^{152}$Eu in a thickness direction of the specimen. Alternatively, $T_{i,k}$ may be determined based on a database concerning a gamma ray transmittance. The transmittance $T_{i,k}$ is a ratio at which the specific gamma rays of the k-th type are transmitted from the reference position $P_i$ in the i-th layer to the surface position $P_s$.

When the gamma ray detector 5a is provided with the collimator 6 as in the example of FIG. 6A, the reference position $P_i$ may be a position in the above-described overlapping region $R_i$ (e.g., a center position of the overlapping region $R_i$). When the collimator 6 is omitted in the gamma ray detector 5a as in the example of FIG. 6B, the reference position $P_i$ may be a position in a region through which neutrons emitted to the inspection target at the time of inspection pass (in an example, $P_i$ is a center position of this region). In the examples of FIG. 6A and FIG. 6B, the reference position $P_i$ is $P_1$ in the first layer, is $P_2$ in the second layer, and is $P_3$ in the third layer. In FIG. 6B, the above-described position $P_s$ differs from layer to layer. By simulation, prior experiment, or theoretical calculation, $T_{i,k}$ is predetermined.

The sign $\varepsilon_{i,k}$ denotes a value determined based on the above-described position relation which is predetermined. In other words, the sign $\varepsilon_{i,k}$ denotes a detection efficiency of the gamma ray detector 5a for the specific gamma rays of the k-th type generated in the i-th layer. In other words, the detection efficiency $\varepsilon_{i,k}$ is a ratio of an amount of the specific gamma rays of the k-th type detected by the gamma ray detector 5a to an amount of the specific gamma rays of the k-th type generated in the i-th layer. The former amount is included in the latter amount. Generally, the detection efficiency depends on a shape of the gamma ray detector 5a, a distance between a gamma ray generation position and the gamma ray detector 5a, an energy of the gamma ray, and the like. Accordingly, the detection efficiency $\varepsilon_{i,k}$ depends on the shape of the gamma ray detector 5a, the energy of the specific gamma ray of the k-th type, a distance between the gamma ray detector 5a and the i-th layer, and the like. For example, $\varepsilon_{i,k}$ may be determined using a gamma ray standard source such as $^{152}$Eu. At this time, no object is made to exist between the gamma ray standard source and the gamma ray detector 5a.

As illustrated in FIG. 6A and FIG. 6B, the detection efficiency $\varepsilon_{i,k}$ may be determined based on a distance between the reference position $P_i$ regarded as a gamma ray generation position and the gamma ray detector 5a, the energy of the specific gamma ray of the k-th type, and the shape of the gamma ray detector 5a.

The sign $b_k$ denotes an absolute intensity (%) of the specific gamma rays of the k-th type. In other words, $b_k$ is m % when the m specific gamma rays of the k-th type are emitted from the target component on the condition that 100 neutrons are captured by the target component. A value of $b_k$ may be a recorded value in a literature or the like.

The sign $d_i$ denotes a thickness of the i-th layer.

The sign $\sigma_i$ denotes a neutron capture reaction cross section of the target component in the i-th layer. A value of $\sigma_i$ depends on energies of neutrons. A value of $\sigma_i$ may be acquired from a database such as Japanese evaluated nuclear data library (JENDL). A value of $\sigma_i$ depends on a neutron energy spectrum in the i-th layer. This neutron energy spectrum may be determined by radiation transport simulation, for example. A value of $\sigma_i$ may be an average value. For example, $\sigma_i$ may be determined by $\sigma_i = \int I(E) \times f(E) dE / \int I(E) dE$. Here, $I(E)$ is the number of neutrons having an energy E in an average neutron energy spectrum in the i-th layer. The average neutron energy spectrum is determined by taking into account a change in a neutron energy spectrum due to a depth in the i-th layer and neutrons returning from the (i+1)-th layer due to scattering. The sign $f(E)$ denotes a capture cross section at an energy E, and $\int$ denotes an integral concerning E.

The sign $N_A$ denotes Avogadro's number ($6.022 \times 10^{23}$/mol). The sign A denotes an atomic weight of the target component. When the target component is one of a plurality of types of isotopes that belong to the same element, r denotes a natural abundance ratio of the target component in a plurality of these types of the isotopes. In this case, $X_i$ in the above-described relational expression (1) is a concentration of this element. When the target component is chlorine $^{35}$Cl, r is 0.7577, and A is 35.4527.

Based on $N_i$, $T_{i,k}$, $\varepsilon_{i,k}$, $b_k$, and the like predetermined in the above-described manner, the coefficient $\alpha_{i,k} = N_i \times T_{i,k} \times \varepsilon_{i,k} \times b_k \times d_i \times \sigma_i \times (N_A \times r/A)$ is determined, and thus, the above-described relational expression (1) using $\alpha_{i,k}$ is stored in the storage unit 7b.

When the number n of the layers is three as in the example of FIG. 6A or FIG. 6B, the above-described relational expression (1) is expressed as the following three relational expressions (11) to (13).

$$X_1 \times N_1 \times T_{1,1} \times \varepsilon_{1,1} \times b_1 \times d_1 \times \sigma_1 \times (N_A \times r/A) + X_2 \times N_2 \times T_{2,1} \times \varepsilon_{2,1} \times b_1 \times d_2 \times \sigma_2 \times (N_A \times r/A) + X_3 \times N_3 \times T_{3,1} \times \varepsilon_{3,1} \times b_1 \times d_3 \times \sigma_3 \times (N_A \times r/A) = D_1 \quad (11)$$

$$X_1 \times N_1 \times T_{1,2} \times \varepsilon_{1,2} \times b_2 \times d_1 \times \sigma_1 \times (N_A \times r/A) + X_2 \times N_2 \times T_{2,2} \times \varepsilon_{2,2} \times b_2 \times d_2 \times \sigma_2 \times (N_A \times r/A) + X_3 \times N_3 \times T_{3,2} \times \varepsilon_{3,2} \times b_2 \times d_3 \times \sigma_3 \times (N_A \times r/A) = D_2 \quad (12)$$

$$X_1 \times N_1 \times T_{1,3} \times \varepsilon_{1,3} \times b_3 \times d_1 \times \sigma_1 \times (N_A \times r/A) + X_2 \times N_2 \times T_{2,3} \times \varepsilon_{2,3} \times b_3 \times d_2 \times \sigma_2 \times (N_A \times r/A) + X_3 \times N_3 \times T_{3,3} \times \varepsilon_{3,3} \times b_3 \times d_3 \times \sigma_3 > (N_A \times r/A) = D_3 \quad (13)$$

Concentration Detection Method

In the concentration detection method according to the second embodiment, the relational expression acquisition processing is processing of predetermining $N_i$, $T_{i,k}$, $\varepsilon_{i,k}$, $b_k$, $d_i$, $\sigma_i$, and the like as described above, and storing, in the storage unit 7b, the above-described relational expression (1) that uses the coefficient $\alpha_{i,k} = N_i \times T_{i,k} \times \varepsilon_{i,k} \times b_k \times d_i \times \sigma_i \times (N_A \times r/A)$.

The concentration detection processing in the concentration detection method according to the second embodiment is similar to that in the case of the first embodiment, and thus, is described below based on the flowchart of FIG. 5.

The concentration detection processing in the second embodiment includes the steps S11 to S14.

At the step S11, the neutron source 3 and the gamma ray detector 5a are arranged in relation to the inspection target 1 as described above so as to be in the predetermined position relation and orientation relation.

At the step S12, the neutron source 3 emits neutrons to the surface 2 of the inspection target 1 in a state of the position relation and the orientation relation that are formed by the arrangement at the step S11 and that are relations among the inspection target 1, the neutron source 3, and the gamma ray detector 5a. For example, in FIG. 6A or FIG. 6B, the neutron source 3 emits neutrons to the surface 2 of the inspection target 1.

At the step S13, the gamma ray detector 5a detects a plurality of the types of the specific gamma rays that are generated in the inspection target 1 by interactions with the neutrons emitted at the step S12 and that are derived from the target component. In addition, at the step S13, the thus-acquired detected data are input from the gamma ray detector 5a to the detected amount extraction unit 5b, and based on the detected data, the detected amount extraction unit 5b determines a detected amount $D_k$ (k is an integer from 1 to n) of the specific gamma rays of each of the n types.

When the number n of a plurality of the layers is three as in FIG. 6A or FIG. 6B, the detected amount $D_1$ of the specific gamma rays of the first type, the detected amount $D_2$ of the specific gamma rays of the second type, and the detected amount $D_3$ of the specific gamma rays of the third type are determined at the step S13.

At the step S14, the concentration calculation unit 7a applies the detected amounts $D_k$ of the n types determined at the step S13, to the above-described respective corresponding n relational expressions (1), i.e., $D_k$ (k is an integer from 1 to n) in $\Sigma X_i \times \alpha_{i,k} = D_k$ stored in the storage unit 7b. The concentration calculation unit 7a thereby generates simultaneous equations $\Sigma X_i \times \alpha_{i,k} = D_k$ in which $D_k$ is the specific numerical value, and solves the simultaneous equations. The concentration calculation unit 7a thus calculates, as a concentration of the target component at each depth or the specific depth in the inspection target 1, a concentration of the target component in the layer existing at each depth or the specific depth among a plurality of the layers in the inspection target 1.

When the number n of a plurality of the layers is three as illustrated in FIG. 6A or FIG. 6B, the concentration calculation unit 7a applies the detected amount $D_1$, the detected amount $D_2$, and the detected amount $D_3$ to $D_1$, $D_2$, and $D_3$, respectively, in the above-described relational expressions (11) to (13), at the step S14. Thereby, the concentration calculation unit 7a generates, as simultaneous equations, the relational expressions (11) to (13) in which $D_1$, $D_2$, and $D_3$ are the specific numerical values. The concentration calculation unit 7a solves the simultaneous equations, and thereby determines concentrations $X_1$, $X_2$, and $X_3$ of the target component in the respective layers in the inspection target 1, or a concentration $X_1$, $X_2$, or $X_3$ in the layer at the specific depth in the inspection target 1.

Advantageous Effect of Second Embodiment

Also in the second embodiment, a concentration of the target component at each depth in the inspection target 1 or at an intended specific depth in the inspection target 1 can be determined non-destructively, similarly to the first embodiment.

THIRD EMBODIMENT

Concentration Detection Device

Figure 7:
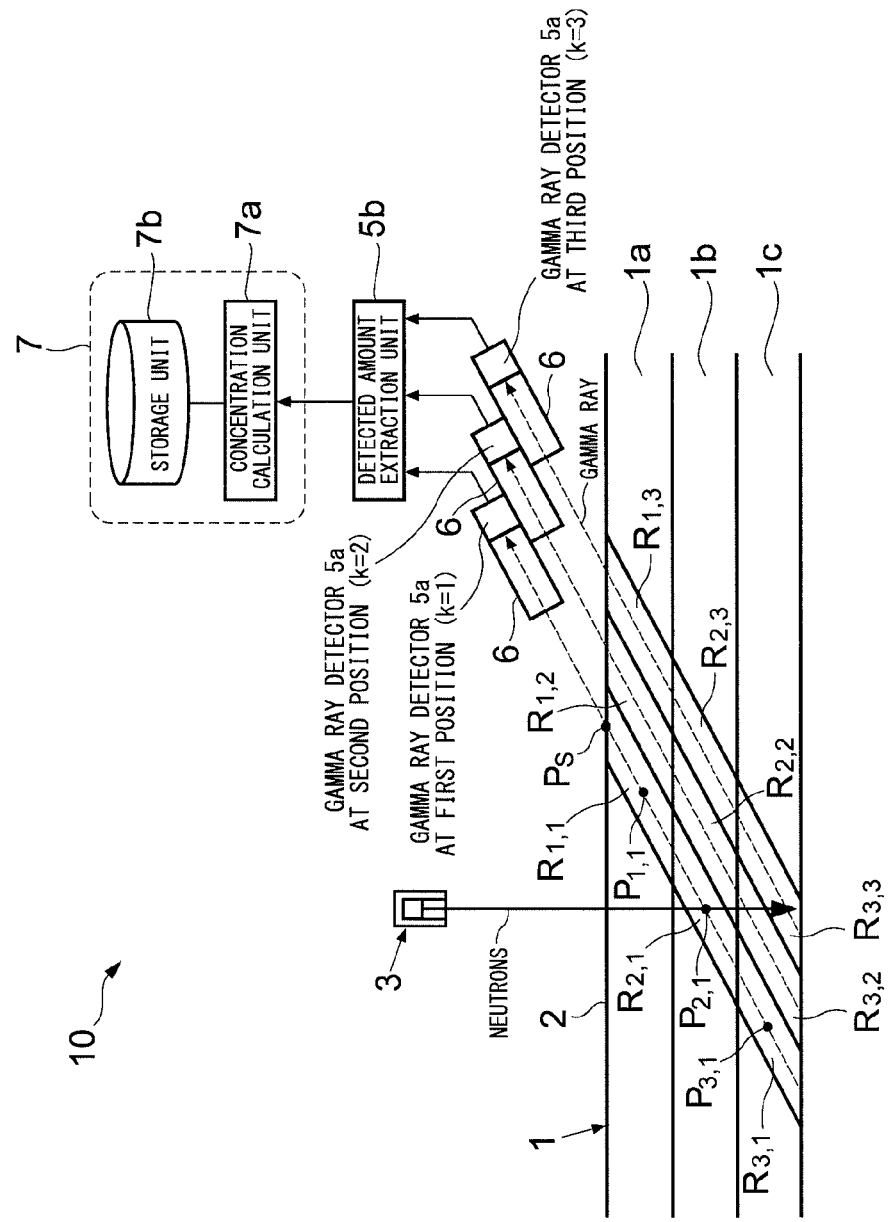
FIG. 7 illustrates a configuration example of a concentration detection device according to a third embodiment of the present invention, and also is an illustration for a relational expression.

The following describes a concentration detection device 10 according to a third embodiment of the present invention. FIG. 7 illustrates a configuration example of the concentration detection device 10 according to the third embodiment. In FIG. 7, the inspection target 1 is virtually divided into three layers 1a, 1b, and 1c as one example. Concerning the third embodiment, the matters that are not described below may be the same as those in the second embodiment.

The concentration detection device 10 according to the third embodiment includes the neutron source 3, the gamma ray detection device 5, and the concentration calculation device 7, as in the second embodiment. The three gamma ray detectors 5a are illustrated in the example of FIG. 7. However, the one gamma ray detector 5a is arranged at a first position, at a second position, and at a third position, in turn, as described below, and in this case, FIG. 7 simultaneously illustrates the arranged states of the gamma ray detector 5a at these positions. In other words, the concentration detection device 10 may include the one gamma ray detection device 5 (one gamma ray detector 5a). The concentration detection device 10 is not limited to the case of including the one gamma ray detection device 5, and may include a plurality of the gamma ray detection devices 5 as described below.

In the third embodiment, when the inspection target 1 is virtually divided into a plurality of the layers, a relational expression between respective concentrations of the target component in these layers and a detected amount of the specific gamma rays is predetermined for each of the detection conditions. Here, the relational expression is determined for each of the detection conditions in the third embodiment, whereas the relational expression is determined for each of the types of the specific gamma rays in the first embodiment. In this regard, the both embodiments differ from each other. However, the other matters concerning a manner of determining the relational expression in the third embodiment may be similar to those in the first embodiment. The detection condition is a condition under which the gamma ray detection device 5 detects the specific gamma rays and thereby determines a detected amount of the specific gamma rays.

In the third embodiment, the relational expression for each of the detection conditions may be, for example, the above-described relational expression (1), i.e., $\Sigma X_i \times \alpha_{i,k} = D_k$. Here, k denotes a number for the detection condition, and takes a value from 1 to n, where n is the number of the above-described layers. In other words, the number of the detection conditions different from each other is the same as the number of the layers into which the inspection target 1 is divided. The relational expression is predetermined for each detection condition k. The n relational expressions (1) are predetermined. For example, the relational expression (the above-described relational expression (1)) for each detection condition k is an expression concerning an arrangement relation corresponding to the detection condition k. Here, this arrangement relation means one or both of a position relation and an orientation relation among the neutron source 3, the gamma ray detector 5a, and the inspection target 1, and hereinafter, is simply referred to as an arrangement relation. Although the sign k denotes the type of the specific gamma rays in the second embodiment, the sign k denotes the above-described arrangement relation in the third embodiment. In other words, a plurality of arrangement relations are predetermined. The number of a plurality of the predetermined arrangement relations is n. The sign k denoting the arrangement relation takes an integer from 1 to n.

In the third embodiment, the number of the types of the specific gamma rays generated from the target component in the inspection target 1 by interactions with neutrons emitted to the inspection target 1 from the neutron source 3 may be one. When a plurality of the types of the specific gamma rays are generated from the target component, a detected amount of the specific gamma rays of the predetermined one type among these types is a detected amount in the above-described relational expression (the above-described relational expression (1)) for each detection condition k.

In the third embodiment, each coefficient $\alpha_{i,k}$ in the above-described relational expression (1) may be the same as that in the first embodiment or the second embodiment. Each coefficient $\alpha_{i,k}$ in the relational expression (1) may be determined in a manner similar to that in the first embodiment or the second embodiment. In the case of determining each coefficient $\alpha_{i,k}$ in the manner similar to that in the first embodiment, the above-described steps S1 to S3 are performed under each detection condition k (arrangement relation), for each order i of the above-described component-containing block. Thereby, each coefficient $\alpha_{i,k}=d_{i,k}/C$ can be determined as in the above-described step S5. The following is supplemental description on the case of determining each coefficient $\alpha_{i,k}$ in the third embodiment in the manner similar to that in the second embodiment.

The coefficient $\alpha_{i,k}$ is expressed by the following expression (14) that is similar to the above-described expression (10).

$$\alpha_{i,k}=N_{i,k} \times T_{i,k} \times \varepsilon_{i,k} \times b_k \times d_i \times \sigma_i \times (N_A \times r/A) \quad (14)$$

The coefficient $\alpha_{i,k}$ is predetermined under the above-described preconditions (a) to (d). The following describes each sign in the expression (14) expressing $\alpha_{i,k}$, while the matters that are not described below may be the same as those in the case of each sign in the expression (10) in the second embodiment. The supplemental description is made below appropriately with reference to FIG. 7. As in the example of FIG. 7, in the third embodiment, the gamma ray detector 5a selectively detects only the specific gamma rays that are among the specific gamma rays generated in the inspection target 1 and that have traveled to the gamma ray detector 5a from a direction corresponding to an orientation of the collimator 6.

The sign $N_{i,k}$ denotes the number of neutrons that enter the overlapping region $R_{i,k}$ in the i-th layer over the above-described predetermined measurement time, under the k-th arrangement relation. The overlapping region $R_{i,k}$ overlaps with the gamma ray detector 5a in a direction of the orientation of the collimator 6, under the k-th arrangement relation. In the example of FIG. 7, the three arrangement relations (i.e., the gamma ray detector 5a at the first to third positions) are simultaneously illustrated, a position k of the gamma ray detector 5a differs among the three arrangement relations, and an orientation of the gamma ray detector 5a (collimators 6) is constant among the three arrangement relations, while a position relation and an orientation relation between the inspection target 1 and the neutron source 3 are constant among the three arrangement relations.

As in the example of FIG. 7, when the number n of a plurality of the layers is three, three positions (arrangement relations) of which number is the same as n are set in advance as positions of the gamma ray detector 5a. In this case, in FIG. 7, three overlapping regions $R_{i,k}$ of $R_{1,1}$, $R_{2,1}$, $R_{3,1}$ are set for a first position (k=1) of the gamma ray detector 5a, three overlapping regions $R_{i,k}$ of $R_{1,2}$, $R_{2,2}$, $R_{3,2}$ are set for a second position (k=2) of the gamma ray detector 5a, and three overlapping regions $R_{i,k}$ of $R_{1,3}$, $R_{2,3}$, $R_{3,3}$ are set for a third position (k=3) of the gamma ray detector 5a. In a manner similar to that in the case of the second embodiment, $N_{i,k}$ is predetermined by simulation or prior experiment.

The sign $T_{i,k}$ denotes a ratio at which the specific gamma rays generated in the overlapping region $R_{i,k}$ are transmitted by an inside of the inspection target 1 on a traveling route to the gamma ray detector 5a. The transmittance $T_{i,k}$ may be determined based on a distance from a reference position $P_{i,k}$ in the overlapping region $R_{i,k}$ on the route to a position (hereinafter, referred to as a surface position $P_s$) in the surface 2 on the route. In other words, the transmittance $T_{i,k}$ is a ratio at which the specific gamma rays are transmitted from the reference position $P_{i,k}$ in the i-th layer to the surface position $P_s$ under the k-th arrangement relation.

The reference position $P_{i,k}$ may be a position in the overlapping region $R_{i,k}$ (e.g., a center position of the overlapping region $R_{i,k}$). In the case where, as illustrated in FIG. 7, a position of the gamma ray detectors 5a differs among a plurality of the arrangement relations, and an orientation of the gamma ray detector 5a is the same as that of the collimator 6, $T_{i,k}$ is constant regardless of the detection condition k (the position k of the gamma ray detectors 5a), and is changed depending on the number i for the layer. In the example of FIG. 7, $T_{1,1}$ is determined based on a distance between the reference position $P_{1,1}$ and a surface position $P_{s,1}$ on the route from the reference position $P_{1,1}$ to the gamma ray detector 5a at the first position, and each of $T_{1,2}$ and $T_{1,3}$ is the same value as $T_{1,1}$. Similarly, in the example of FIG. 7, $T_{2,1}$ is determined based on a distance between the reference position $P_{2,1}$ and the surface position $P_{s,1}$, each of $T_{2,2}$ and $T_{2,3}$ is the same value as $T_{2,1}$, $T_{3,1}$ is determined based on a distance between the reference position $P_{3,1}$ and the surface position $P_{s,1}$, and each of $T_{3,2}$ and $T_{3,3}$ is the same value as $T_{3,1}$.

The sign $\varepsilon_{i,k}$ denotes a value determined based on the above-described arrangement relation which is predetermined. In other words, the sign $\varepsilon_{i,k}$ denotes a detection efficiency of the gamma ray detector 5a for the specific gamma rays generated in the overlapping region $R_{i,k}$. The detection efficiency $\varepsilon_{i,k}$ may be determined based on a distance between a reference position $P_{i,k}$ regarded as a gamma ray generation position and the gamma ray detector 5a, the energy of the specific gamma ray, and a shape of the gamma ray detector 5a. In the case where, as illustrated in FIG. 7, a position k of the gamma ray detector 5a differs among a plurality of the arrangement relations, and an orientation of the gamma ray detector 5a is the same as that of the collimator 6, $\varepsilon_{i,k}$ is constant regardless of the detection condition k (the position k of the gamma ray detector 5a), and is changed depending on the number i for the layer.

The signs $b_k$, $d_i$, $\sigma_i$, and the like are the same as those in the second embodiment. The coefficient $\alpha_{i,k}=N_{i,k} \times T_{i,k} \times \varepsilon_{i,k} \times b_k \times d_i \times \sigma_i \times (N_A \times r/A)$ is predetermined based on $N_{i,k}$, $T_{i,k}$, $\varepsilon_{i,k}$, and the like which are predetermined as described above. The above-described relational expression (1) using $\alpha_{i,k}$ is stored in the storage unit 7b.

When the number n of the layers is three as in the example of FIG. 7, the above-described relational expression (1) is expressed similarly to the above-described relational expressions (11) to (13) in the second embodiment.

Concentration Detection Method

The relational expression acquisition processing in the concentration detection method according to the third embodiment is processing of predetermining $\alpha_{i,k}$ as described above, and storing, in the storage unit 7, the above-described relational expression (1) using $\alpha_{i,k}$.

Figure 8:
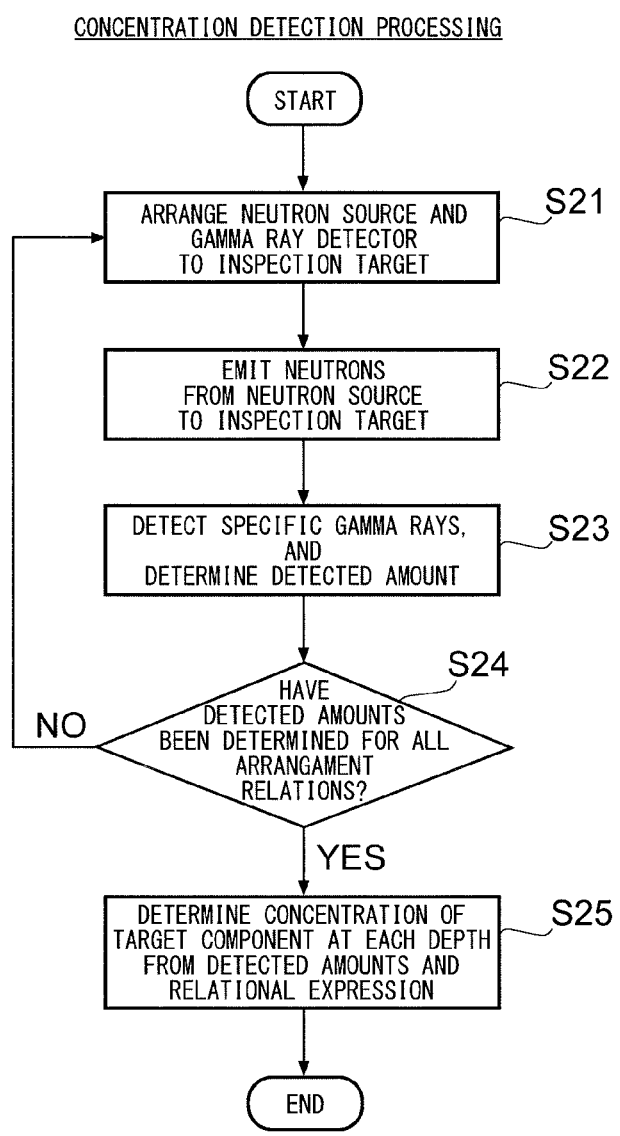
FIG. 8 is a flowchart illustrating concentration detection processing in the concentration detection method according to the third embodiment of the present invention.

FIG. 8 is a flowchart illustrating the concentration detection processing in the concentration detection method according to the third embodiment. The concentration detection processing in the third embodiment includes steps S21 to S25.

At the step S21, the neutron source 3 and the gamma ray detector 5*a* are arranged in relation to the inspection target 1, in the k-th arrangement relation. In the case of FIG. 7, for example, the gamma ray detector 5*a* is arranged at the first position (k=1) of the gamma ray detector 5*a* in this drawing.

At the step S22, the neutron source 3 emits neutrons to the surface 2 of the inspection target 1, in a state of the arrangement relation formed at the step S21.

At the step S23, the gamma ray detector 5*a* detects the specific gamma rays that are generated in the inspection target 1 by interactions with the neutrons emitted at the step S22 and that are derived from the target component. At the step S23, the thus-acquired detected data are input from the gamma ray detector 5*a* to the detected amount extraction unit 5*b*, and based on the detected data, the detected amount extraction unit 5*b* determines a detected amount $D_k$ of the specific gamma rays.

At the step S24, it is determined whether or not the above-described steps S22 and S23 have been performed for all the arrangement relations. When a result of this determination is negative, the processing returns to the step S21, and the steps S21 to S24 are performed again. At the re-started step S21, the neutron source 3 and the gamma ray detector 5*a* are arranged in relation to the inspection target 1, in the arrangement relation that are among a plurality of the predetermined arrangement relations and in which the neutron source 3 and the gamma ray detector 5*a* have not been arranged yet. In this state, the steps S22 to S24 are performed again.

An example in the case of FIG. 7 is as follows: At the second-time step S21, the gamma ray detector 5*a* is arranged at the second position (k=2) of the gamma ray detector 5*a* in this drawing. Then, the steps S22 and S23 are performed again. At the third-time step S21, the gamma ray detector 5*a* is arranged at the third position (k=3) of the gamma ray detector 5*a* in this drawing. Then, the steps S22 and S23 are performed again.

When a result of the determination at the step S24 is affirmative, the processing proceeds to the step S25. In this case, the detected amount $D_k$ (k is an integer from 1 to n) has been determined at the step S23, for each of all (n types) of the predetermined arrangement relations. When n is three as illustrated in FIG. 7, a detected amount $D_1$ for the first arrangement relation, a detected amount $D_2$ for the second arrangement relation, and a detected amount $D_3$ for the third arrangement relation have been determined by three times of the step S23.

At the step 25, the concentration calculation unit 7*a* applies the n detected amounts $D_k$ determined by a plurality of times (n times) of the step S23, to the above-described respective corresponding n relational expressions (1), i.e., $D_k$ (k is an integer from 1 to n) in $\Sigma X_i \times \alpha_{i,k} = D_k$ stored in the storage unit 7*b*. The concentration calculation unit 7*a* thereby generates simultaneous equations $\Sigma X_i \times \alpha_{i,k} = D_k$ in which $D_k$ is the specific numerical value, and solves the generated simultaneous equations. The concentration calculation unit 7*a* thus calculates, as a concentration of the target component at each depth or a specific depth in the inspection target 1, a concentration of the target component in the layer existing at each depth or the specific depth among a plurality of the layers in the inspection target 1.

When the number n of a plurality of the layers is three as illustrated in FIG. 7, the concentration calculation unit 7*a* applies the detected amount $D_1$, the detected amount $D_2$, and the detected amount $D_3$ determined by three times of the step S23, to $D_1$, $D_2$, and $D_3$, respectively, in the above-described relational expressions (7) to (9) similar to those in the case of the first embodiment or in the above-described relational expressions (11) to (13) similar to those in the case of the second embodiment. Thereby, the concentration calculation unit 7*a* generates, as simultaneous equations, the relational expressions (7) to (9) or (11) to (13) in which $D_1$, $D_2$, and $D_3$ are the specific numerical values. The concentration calculation unit 7*a* solves the generated simultaneous equations, and thereby determines concentrations $X_1$, $X_2$, and $X_3$ of the target component in the respective layers in the inspection target 1, or a concentration $X_1$, $X_2$, or $X_3$ in the layer at the specific depth in the inspection target 1.

Case of Providing Plural Gamma Ray Detection Devices

In the third embodiment, the concentration detection device 10 may include a plurality of (n) gamma ray detection devices 5. In this case, at the one-time step S21, the n gamma ray detectors 5*a* may be simultaneously arranged at respective positions different from each other. Thereby, an arrangement relation among each gamma ray detector 5*a*, the neutron source 3, and the inspection target 1 is regarded as one arrangement relation, and thus, the n arrangement relations are simultaneously formed. For example, when n is three, the gamma ray detectors 5*a* may be arranged at the respective first to third positions in FIG. 7, and thus, the three gamma ray detectors 5*a* simultaneously form the three arrangement relations at the one-time step S21.

Accordingly, at the subsequent steps S22 and S23, each of the gamma ray detection devices 5 determines a detected amount $D_k$ (k is an integer from 1 to n). Here, $D_k$ is a detected amount of the specific gamma rays determined by the gamma ray detection devices 5 that includes the k-th gamma ray detector 5*a*. Thus, the steps S21 to S23 are performed once, and thereby, the n detected amounts $D_k$ are acquired. Then, the processing proceeds to the step S25 without performing the step S24, and at the step S25, the concentration calculation unit 7*a* applies the n detected amounts $D_k$ to the above-described relational expressions (1), and thereby calculates a concentration of the target component in the layer existing at each depth or the specific depth, similarly to the above-described case.

Advantageous Effect of Third Embodiment

Also in the third embodiment, a concentration of the target component at each depth or an intended specific depth in the inspection target 1 can be determined non-destructively, similarly to the first embodiment.

APPLICATION EXAMPLE

Although the concentration detection device 10 and the concentration detection method according to each of the above-described embodiments can be applied to any of various structures, materials, and members, the inspection target 1 may be, for example, a concrete structure that includes reinforcing bars inside. When the inspection target 1 is a concrete structure that includes reinforcing bars inside, the concentration detection method may be performed as follows. Here, the concentration detection method to be performed may be the concentration detection method according to any one of the first, second, and third embodiments.

Assuming the target component is set as a component (e.g., steel or another component) of the reinforcing bar, the above-described relational expression (e.g., the above-described relational expression (1)) concerning the component of the reinforcing bar is predetermined by performing the above-described relational expression acquisition processing, and is stored in the storage unit 7b as a relational expression for the reinforcing bar.

In addition, assuming that the target component is set as chlorine, the above-described relational expression (e.g., the above-described relational expression (1)) concerning chlorine is predetermined by performing the above-described relational expression acquisition processing, and is stored in the storage unit 7b as a relational expression for chlorine.

Then, assuming that the target component is the component of the reinforcing bar, a concentration of the component of the reinforcing bar in each of the layers is determined by performing the above-described concentration detection processing. The relational expression used at this time is the relational expression for the reinforcing bar. The layer for which the concentration of the component of the reinforcing bar determined at this time is equal to or higher than a predetermined threshold value is determined as the layer at a specific depth in which the reinforcing bar exists.

Next, assuming that the target component is chlorine, a concentration of chlorine in the layer (the layer at the specific depth) for which the concentration of the component of the reinforcing bar is equal to or higher than the predetermined threshold value is determined by performing the above-described concentration detection processing. The relational expression used at this time is the relational expression for chlorine.

In this manner, the layer for which the concentration of the component of the reinforcing bar is equal to or higher than the threshold value is determined as the layer in which the reinforcing bar exists, and the concentration of chlorine in this layer is determined. Thereby, the concentration of chlorine in the layer (at the depth) where the reinforcing bar exists can be determined. When this concentration of chlorine is high, it can be determined that the reinforcing bar are probably corroded.

The present invention is not limited to the above-described embodiments. As a matter of course, various modifications can be made within the scope of the technical idea of the present invention. For example, the following modification example 1 or 2 may be adopted. In this case, the matters that are not described below may be the same as those described above.

MODIFICATION EXAMPLE 1

According to the modification example 1, in the above-described first or second embodiment, a plurality of types of arrangement relations may be used in addition to using a plurality of the types of the specific gamma rays, as described below. In this modification example 1, the above-described relational expression (1) is expressed as the following expression (15).

$$\Sigma X_i \times \alpha_{i,k,j} = D_{k,j} \tag{15}$$

In the expression (15), the subscript j of $\alpha_{i,k,j}$ and $D_{k,j}$ denotes a number for the arrangement relation, and takes a value from 1 to q, where q is the number of the arrangement relations. The arrangement relation j means one or both of a position relation and an orientation relation among the neutron source 3, the gamma ray detector 5a, and the inspection target 1. Accordingly, $\alpha_{i,k,j}$ is a coefficient for the k-th type of the specific gamma rays, the i-th layer, and the j-th arrangement relation. Thus, in the modification example 1, $\alpha_{i,k,j}$ depends also on the arrangement relation j, as compared with the above-described coefficient $\alpha_{i,k}$. However, the other matters of $\alpha_{i,k,j}$ are similar to those of the above-described coefficient $\alpha_{i,k}$.

In the modification example 1, assuming that the number of the arrangement relations j is q as described above, the number of the used types k of the specific gamma rays is s (i.e., k takes a value from 1 to s), and the number of the layers i into which the inspection target 1 is virtually divided is n (i.e., i takes a value from 1 to n), a relation among n, q, and s may satisfy an inequality n≤q×s in order to solve simultaneous equations as described below. Each of n, q, and s may be equal to or larger than two. Each of n and q may be equal to or larger than two, and s may be one (e.g., n=3, q=3, and s=1), but this case is included in the above-described third embodiment.

The relational expression (i.e., $\alpha_{i,k,j}$) in the expression (15) is predetermined for each combination of the layer i, the type k, and the arrangement relation j by relational expression acquisition processing similar to that in the case of the first embodiment or the second embodiment. Concerning this, in the modification example 1 of the first embodiment, a plurality of the gamma ray detection devices 5 (gamma ray detectors 5a) may be arranged at the step S1 in the flowchart of FIG. 3 so as to simultaneously form all of the q arrangement relations j, and in this state, the subsequent respective steps of the relational expression acquisition processing are performed, and thus, the relational expression acquisition processing may be performed only once. Alternatively, the relational expression acquisition processing may be performed twice or more times such that one or a plurality of gamma ray detection devices 5 (gamma ray detectors 5a) are arranged at the step S1 so as to form a part of the arrangement relations j, and the relational expression acquisition processing is performed for this part of the arrangement relations j, and then, the relational expression acquisition processing is performed for the remaining arrangement relations j in a similar manner.

In the concentration detection processing, a plurality of the (q) gamma ray detection devices 5 (gamma ray detectors 5a) may be arranged at the above-described step S11 in the flowchart of FIG. 5 so as to form all of the q arrangement relations j. In other words, the concentration detection device 10 may include a plurality of the gamma ray detection devices 5.

At the step S12, the neutron source 3 emits neutrons to the surface 2 of the inspection target 1 in a state of the arrangement state formed at the step S11.

At the step S13, the gamma ray detector 5a in each of the q gamma ray detection devices 5 detects the specific gamma rays of a plurality of the types (s types) that are generated in the inspection target 1 by interactions with the neutrons emitted at the step S12 and that are derived from the target component. The thus-acquired detected data are input from the gamma ray detectors 5a to the corresponding detected amount extraction units 5b. Based on the detected data, the detected amount extraction units 5b determines respective detected amounts $D_{k,j}$ of the specific gamma rays of the s types.

At the step S14, the concentration calculation unit 7a applies the q×s detected amounts $D_{k,j}$ determined at the step S13, to the above-described respective corresponding q×s relational expressions (15), i.e., $D_{k,j}$ in $\Sigma X_i \times \alpha_{i,k,j} = D_{k,j}$ stored in the storage unit 7b. The concentration calculation unit 7a thereby generates simultaneous equations $\Sigma X_i \times \alpha_{i,k,j} = D_{k,j}$ in which $D_{k,j}$ is the specific numerical value, and solves the simultaneous equations. The concentration calculation unit 7a thus calculates, as a concentration of the target component at each depth or a specific depth in the inspection target 1, a concentration of the target component in the layer existing at each depth or the specific depth among a plurality of the layers in the inspection target 1.

One or a plurality of gamma ray detection devices 5 (gamma ray detectors 5a) may be arranged at the step S11 so as to form a part of the arrangement relations j included in the s arrangement relations, and the step S12 and the step S13 may be performed for this part of the arrangement relations j. Then, the steps S11 to S13 may be performed for a remaining part of the arrangement relations j, in a similar manner. Thus, the steps S11 to S13 may be performed twice or more times, and thereby, all the (q×s) detected amounts $D_{k,j}$ may be determined. Then, the step S14 is performed for these detected amounts $D_{k,j}$, similarly to the above-described case.

According to the modification example 1, when the number of the arrangement relations j is q, the number of the types k of the specific gamma rays is s, and the number of the layers i is n, the inequality n≤q×s may be satisfied. Thus, the number of the used types of the specific gamma rays can be reduced. For example, when the number of the types of the specific gamma rays deriving from the target component is small, the modification example 1 can determine a concentration of the target component at each depth in the inspection target 1, without reducing the number of the layers i.

MODIFICATION EXAMPLE 2

A relational expression (function) that expresses a relation between a plurality of concentrations in a plurality of the layers and a detected amount of the specific gamma rays detected by the gamma ray detection device 5 does not need to be a linear expression such as the above-described relational expression (1). In this case, the relational expression may be expressed by the following expression (16), for example.

$$\Sigma F_{i,k}(X_i) = D_k \quad (16)$$

Here, $F_{i,k}$ denotes a function of $X_i$ for the i-th layer, concerning the above-described type k of the specific gamma rays or the above-described detection condition k (arrangement relation). The function $F_{i,k}$ may differ among the respective layers. However, $F_{i,k}$ may be the same function for the respective layers. Additionally, the function $F_{i,k}$ may be the same for the respective detection conditions k, or may differ among the respective detection conditions k. Such a relational expression (16) may be predetermined by simulation, experiment, or theoretical calculation, and may be stored in the storage unit 7b.

Additionally, in the modification example 1, the following expression (17) may be used instead of the above-described relational expression (16).

$$\Sigma F_{i,k,j}(X_i) = D_{k,j} \quad (17)$$

Here, $F_{i,k,j}$ is a function of $X_i$ for the i-th layer, concerning a combination of the type k of the specific gamma rays and the arrangement relation j. The relational expression (17) may be predetermined by simulation, experiment, or theoretical calculation, and may be stored in the storage unit 7b.

1: inspection target, 1a, 1b, 1c: layer, 2: surface, 3: neutron source, 5: gamma ray detection device, 5a: gamma ray detector, 5b: detected amount extraction unit, 6: collimator, 7: concentration calculation device, 7a: concentration calculation unit, 7b: storage unit, 10: concentration detection device, 101: specimen, 101a: component-containing block, 101b: component-zero block, 102: surface

The invention claimed is:

1. A concentration detection device comprising:
a neutron source that emits neutrons to a surface of an inspection target so that specific gamma rays having different energies and derived from a target component in the inspection target are generated in the inspection target as a result of interactions between the target component and the neutrons;
a gamma ray detection device that includes a gamma ray detector detecting a specific gamma ray included in the specific gamma rays, and determines, for each of the different energies, a number of times the gamma ray detector detects the specific gamma ray; and
a concentration calculation device that includes a storage unit storing a plurality of relational expressions;
wherein a plurality of arrangement relations are each defined as one or both of a position relation and an orientation relation among the neutron source, the gamma ray detector, and the inspection target;
each of the plurality of relational expressions is set for corresponding one of the different energies or for corresponding one of a plurality of combinations, and each of the plurality of combinations is a combination of one of the different energies and one of the plurality of arrangement relations;
the inspection target is assumed to be virtually divided into a plurality of layers, and a plurality of concentrations are each defined as a concentration of the target component in corresponding one of the plurality of layers;
each of the plurality of relational expressions expresses, by unknown values of the plurality of concentrations and a plurality of predetermined coefficients, a variable of a number of times the gamma ray detector detects the specific gamma ray for the corresponding one of the different energies or the corresponding one of the plurality of combination; and
the concentration calculation device:
assigns, for each of the different energies or each of the plurality of combinations, the determined number of times to the variable in corresponding one of the plurality of relational expressions, and
calculates, as the concentration of the target component in one or each of the plurality of layers, one or each of the unknown values, from the plurality of relational expressions in each of which the determined number of times has been assigned to the variable.

2. The concentration detection device according to claim 1, wherein each of the plurality of relational expressions is expressed as $$\Sigma X_i \times \alpha_{i,k} = D_k,$$

where i denotes a number for each of the plurality of layers, k denotes a number for each of the different energies, each of i and k takes a value from 1 to n, and n is an integer equal to or larger than 2, $X_i$ denotes the concentration of the target component in an i-th layer included in the plurality of layers, $\alpha_{i,k}$ is a predetermined coefficient included in the plurality of predetermined coefficients, and is set for the i-th layer and a k-th energy included in the different energies, $\Sigma$ denotes a total sum concerning all of the plurality of layers i, and $D_k$ is the determined number of times for the k-th energy.

3. The concentration detection device according to claim 1, wherein each of the plurality of relational expressions is expressed as $$\Sigma X_i \times \alpha_{i,k,j} = D_{k,j},$$

where i denotes a number for each of the plurality of layers, and k denotes a number for each of the different energies, j denotes a number for each of the plurality of arrangement relations, i takes a value from 1 to n, k takes a value from 1 to s, i takes a value from 1 to q, each of n, s, and q is an integer equal to or larger than 2, and n is equal to q×s, Xi denotes the concentration of the target component in an i-th layer included in the plurality of layers, $\alpha_{i,k,j}$ is a predetermined coefficient included in the plurality of predetermined coefficients, and is set for the i-th layer, a k-th energy included in the different energies, and a j-th arrangement relation included in the plurality of arrangement relations, $\Sigma$ denotes a total sum concerning all of the plurality of layers i, and $D_{k,j}$ denotes the determined number of times for the k-th energy and the j-th arrangement relation that constitute one of the plurality of combinations.

4. The concentration detection device according to claim 1, wherein the inspection target is a concrete structure including a reinforcing bar inside, and the target component is chlorine.

5. A concentration detection method using the concentration detection device according to claim 1, comprising:

a step (A) of emitting neutrons to a surface of an inspection target by the neutron source so that specific gamma rays having different energies and derived from a target component in the inspection target are generated in the inspection target as a result of interactions between the target component and the neutrons; and a step (B) of, by the gamma ray detector, detecting a specific gamma ray included in the specific gamma rays, and by gamma ray detection device, determining, for each of the different energies, a number of times the gamma ray detector detects the specific gamma ray, wherein the detecting at the step (B) is performed for each of the different energies or for each of the plurality of combinations so as to determine the number of times for each of the different energies or for each of the plurality of combinations, the method comprises:

a step (C) of, by the concentration calculation device, assigning, for each of the different energies or each of the plurality of combinations, the determined number of times to the variable in corresponding one of the plurality of relational expressions, and calculating, as the concentration of the target component in one or each of the plurality of layers, one or each of the unknown values, from the plurality of relational expressions in each of which the determined number of times has been assigned to the variable.

6. The concentration detection method according to claim 5, wherein the inspection target is a concrete structure including a reinforcing bar inside, and the target component is chlorine.

7. The concentration detection method according to claim 5, wherein the inspection target is a concrete structure including a reinforcing bar inside, the method comprises:

on assumption that the target component is a component of the reinforcing bar, performing the steps (A) to (C), thereby calculating a concentration of the component of the reinforcing bar in each of the plurality of layers;

a step (D) of determining, as a layer where the reinforcing bar exists, a layer that is included in the plurality of layers and for which the concentration of the component of the reinforcing bar is equal to or larger than a threshold value; and on assumption that the target component is chlorine, performing the steps (A) to (C), thereby determining a concentration of chlorine in the layer determined at the step (D).

* * * * *